United States Patent
Jonsson

(10) Patent No.: US 8,185,949 B2
(45) Date of Patent: May 22, 2012

(54) UPNP CDS USER PROFILE

(75) Inventor: Karl Jonsson, Rancho Santa Margarita, CA (US)

(73) Assignee: Cisco Technology, Inc., San Jose, CA (US)

( * ) Notice: Subject to any disclaimer, the term of this patent is extended or adjusted under 35 U.S.C. 154(b) by 456 days.

(21) Appl. No.: 12/274,542

(22) Filed: Nov. 20, 2008

(65) Prior Publication Data

US 2010/0125907 A1 May 20, 2010

(51) Int. Cl.
*H04L 29/06* (2006.01)

(52) U.S. Cl. .......... 726/18; 726/6; 726/12; 726/19; 709/217; 709/203; 709/223; 709/224; 709/230; 709/232; 709/246; 709/248; 725/78

(58) Field of Classification Search .......... 726/6, 12, 726/18; 709/217, 203, 223, 224, 231, 246, 709/248; 725/78
See application file for complete search history.

(56) References Cited

U.S. PATENT DOCUMENTS

| | | | | |
|---|---|---|---|---|
| 7,925,682 | B2* | 4/2011 | Moore et al. | 707/831 |
| 2008/0028088 | A1* | 1/2008 | Walter et al. | 709/230 |
| 2008/0155663 | A1* | 6/2008 | Knowlson et al. | 726/5 |
| 2008/0317012 | A1* | 12/2008 | Singh | 370/357 |

* cited by examiner

*Primary Examiner* — Vivek Srivastava
*Assistant Examiner* — Hee Song
(74) *Attorney, Agent, or Firm* — Haynes and Boone, LLP

(57) ABSTRACT

In one embodiment, an apparatus includes a hierarchy of authentication folders configured in a control directory server (CDS) of a Universal Plug and Play (UPnP) network, a personal identification number (PIN) code associated with a user and comprising of identifiers, and non-public media content organized in the CDS to provide selective service to users, where the non-public media content is made accessible to the user when the user is authenticated with a selection of the hierarchy of authentication folders.

17 Claims, 5 Drawing Sheets

UPNP CDS USER PROFILE

TECHNICAL FIELD

The present disclosure relates generally to authentication and authorization in a shared network and, in particular, to user and content management in a Universal Plug and Play (UPnP) network.

BACKGROUND

UPnP provides universal connectivity and plug-and-play functionality in home and office networks. The UPnP architecture supports zero-configuration networking and automatic discovery of services. A device can dynamically join a network, obtain an internet protocol (IP) address, announce its name, convey its capabilities upon request, and learn about the presence and capabilities of other devices. Because UPnP was designed to operate in small networks with trusted devices and users, authentication and authorization of devices were not important. However, as the number of users, contents and services proliferates, secured access and user/content management can become issues. For example, not all content should be shared with every user connected to the network when sensitive data such as personalized libraries are present. Additionally, the conventional organization of UPnP media content is not well suited for servicing multiple users with different access rights and service levels.

Conventional solutions to the authentication and authorization issue involve modification and installation of additional software on the client side. These may not be feasible with existing client devices, especially those with limited input controls such as TV remote controls. Conventional authentication schemes may also be too sophisticated for a home network requiring only low security level.

BRIEF DESCRIPTION OF THE DRAWINGS

These figures are provided to assist in describing embodiments of the disclosure, and are not intended to be exclusive or limiting. In the figures, like reference numerals designate like elements.

DESCRIPTION

Overview

In one embodiment, an apparatus can include a hierarchy of authentication folders configured in a control directory server (CDS) of a UPnP network, a personal identification number (PIN) code associated with a user and comprising of identifiers, and non-public media contents organized in the CDS to provide selective service to user, where the non-public media content is made accessible to the user when the user is authenticated with a selection of the hierarchy of authentication folders.

In one embodiment, a method can include comparing a selected folder from each level of a hierarchy of authentication folders with a corresponding identifier of a PIN code for user authentication.

In one embodiment, a method can include displaying a first level of a hierarchy of authentication folders for selection, displaying a second level of the hierarchy of authentication folders under a selected folder of the first level for further selection, repeatedly displaying a next level of the hierarchy of authentication folders until there is no more level for selection, and validating the selection of the folders of the hierarchy of authentication folders to display a user folder for further selection.

DESCRIPTION OF EXAMPLE EMBODIMENTS

The UPnP architecture is a distributed, open networking architecture where all devices are implicitly authorized to make request to access media content hosted on other devices. The media content also may be organized in a flat structure since there is no authorization process to control device access to the content. Embodiments of the present disclosure enable a device to authenticate and authorize another device in a simple, extensible manner without modifying or installing any software on the client device. Embodiments of the present disclosure also organize the media contents in a hierarchical structure to service devices with different access rights and to accommodate growth in the number and type of contents.

Figure 1:
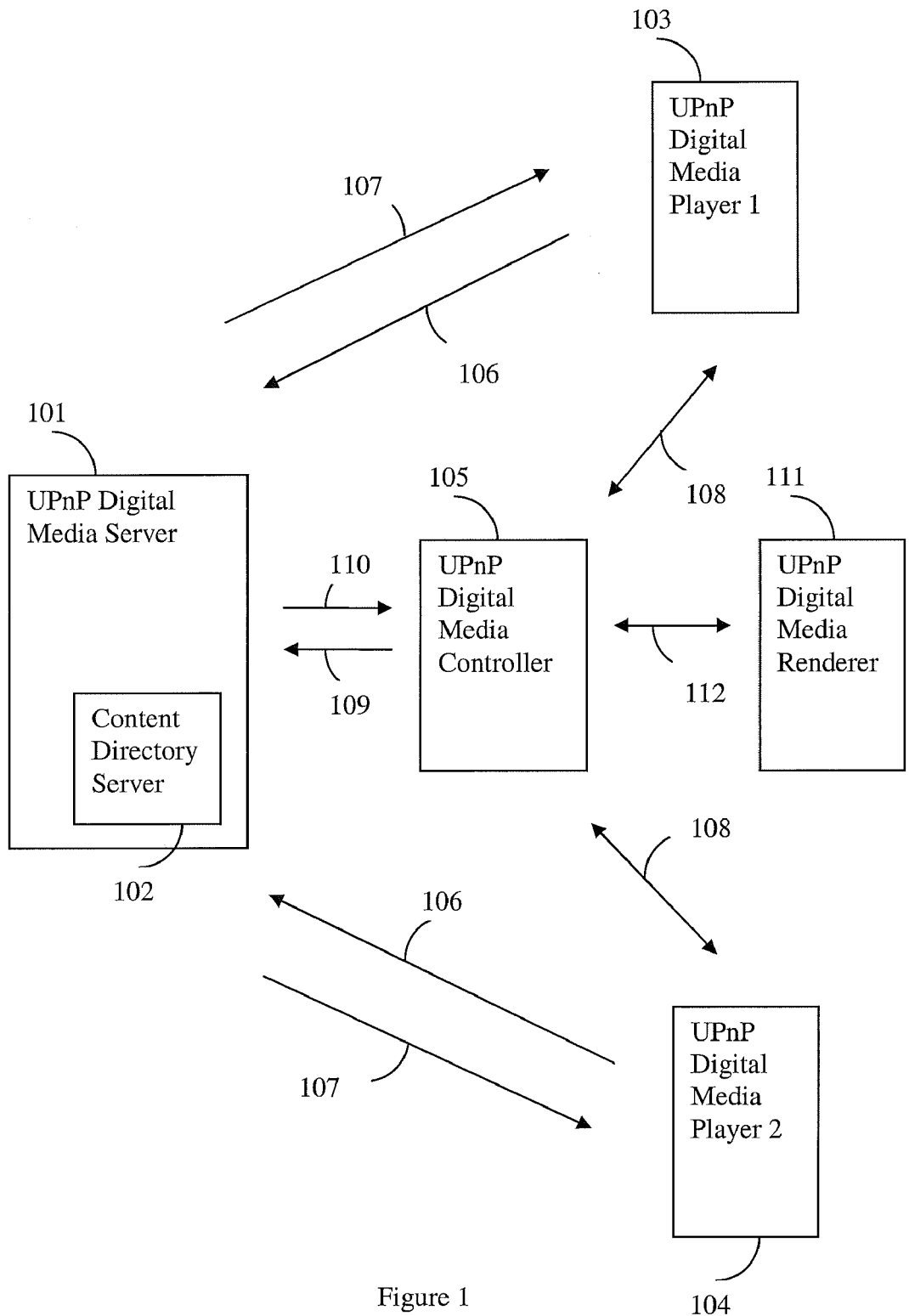
FIG. 1 illustrates an UPnP network implementing an example user profile to authenticate and authorize users.

FIG. 1 illustrates an UPnP network implementing an example UPnP user profile to authenticate and authorize users in accordance with one embodiment of the present disclosure. The UPnP network may include a UPnP digital media server (DMS) 101, UPnP digital media players (DMP) 103, 104, a UPnP digital media renderer (DMR) 111, and a UPnP digital media controller (DMC) 105. The DMS 101 shares or streams media content to client devices on the network. For example, the DMS 101 may be a content server that stores and streams video/audio content over the network to a user on the DMP 103. The DMP 103, 104 and DMR 111 are client devices that render the media contents for display or playback. For example, DMP 103/104 may be televisions or personal digital assistants that play the video/audio content received from the DMS 101. Some client devices such as the DMR 111 are not capable of interfacing directly with the DMS 101, but instead have to receive media content through the DMC 105. The DMC 105 is a device that can auto-detect media servers such as the DMS 101 on the network to set up connections between the DMS 101 and the client devices. For example, the DMC 105 may have the capability to find media content on the DMS 101 and match it to the rendering capabilities of the DMR 111. DMC 105 may be an intelligent remote control.

The media content of the DMS 101 may be managed by a content directory server (CDS) 102 running on the DMS 101. The CDS 102 presents and controls access to both public and non-public media content by the client devices. In an example embodiment of the present disclosure, a user profiles directory for authenticating and authorizing users on the client devices may also be implemented by the CDS 102. The user profiles directory may use personal identification number (PIN) codes comprising of a series of identifiers to authenticate users requesting media content from the DMP. Once users are authenticated, the user profiles directory may also control access rights and service levels to the media content authorized for the users. The media content may be stored in directories outside of the user profiles directory and linked to the user profiles directory for access by the users after the authentication and authorization of the users.

A user on DMP 103, 104 desiring access to the media content on the DMS may initiate a request 106 to the DMS 101. The user may proceed to enter its PIN code for authentication using the user profiles directory of the CDS 102. After the CDS 102 authenticates the user through the PIN code, a user profile for the user is activated. The user may proceed to browse and select the media content authorized for the user from the activated user profile. The CDS 102 on the DMS 101 then streams the selected media content 107 back to the DMP 103, 104. Alternatively, the user may receive the media content from the DMS 101 through the DMC 105. DMC 105 may initiate a request 109 to the DMS 101 using the PIN code selected for the DMC 105. After the CDS 102 authenticates the DMC 105, the user profile for the DMC 105 is activated. The DMC 105 may proceed to browse and select the authorized media contents from the activated user profile. The DMS 101 streams the selected media content 110 to the DMC 105, which then sets up the connections for streaming the content 108, 112 to the DMP 103/104, or the DMR 111 respectively, without having the DMS 101 authenticate or authorize the DMP 103/104 or the DMR 111. Thus, the CDS 102 manages the user profiles directory to authenticate the users and to provide authorized media content to service multiple users with different access rights and service levels.

Figure 2:
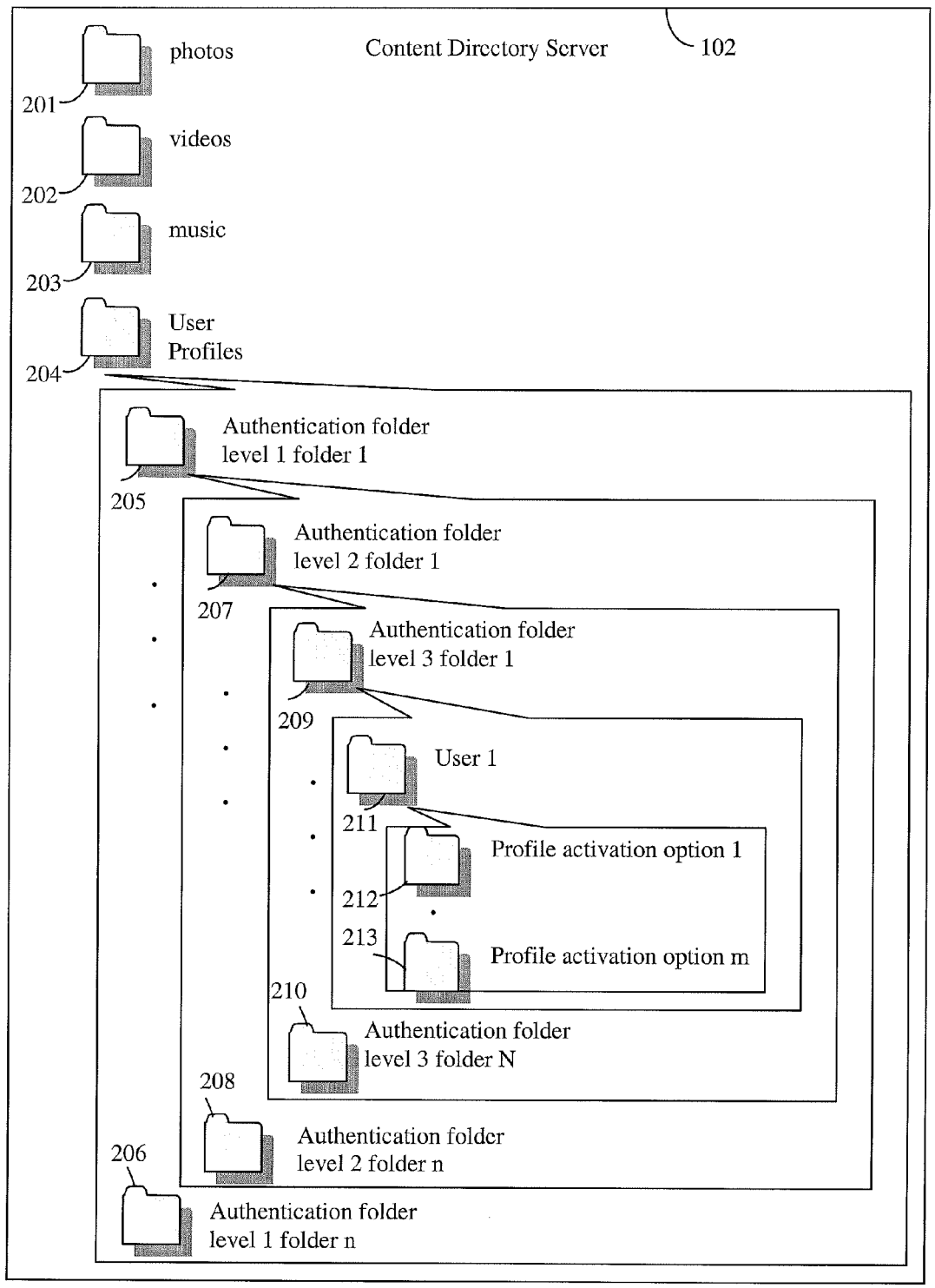
FIG. 2 illustrates an example virtual content folder implementation of a user profiles directory in a control directory server.

FIG. 2 illustrates an example embodiment of the implementation of the user profiles directory in the CDS 102 for authenticating and authorizing users. The CDS has within it the main content directories, shown as the photos 201, videos 202, and music 203 directories used for the storage of media content. Additionally, a virtual content directory called "user profiles" 204 is implemented for the authentication and authorization of users. The user profiles directory 204 has within it a hierarchy of authentication folders. The hierarchy may be configured such that there are as many levels in the hierarchy of authentication folders as the number of identifiers used to construct the PIN code. For example, if the number of identifiers of the PIN code is limited to 5, then the hierarchy of authentication folders is configured to be 5 levels deep. Each level of the hierarchy corresponds to an identifier in the PIN code. Each level of the hierarchy may also include a set of authentication folders corresponding to the set of elements used to construct the corresponding identifier. For example, a PIN code of 524 is constructed from three identifiers with 5 being the first identifier, 2 being the second identifier, and 4 being the third identifier. Thus, there may be three levels of hierarchy in the authentication folders beneath the user profiles directory to correspond to the three identifiers. In addition, each identifier may be selected from the set of numbers 0 through 9. Correspondingly, there may be 10 authentication folders in each hierarchy, one for each of the 10 elements 0 through 9 used to construct the identifier.

In the example embodiment of FIG. 2, a PIN code comprises of three identifiers with each identifier constructed from a set of n elements. The first level of hierarchy in the authentication folders is labeled level 1 and has folders 1 205 through n 206 to correspond to the set of n elements for the first identifier. Similarly, the second level of hierarchy is labeled level 2 and has folders 1 207 through n 208 to correspond to the set of n elements used to construct the second identifier; the third level of hierarchy is labeled level 3 and has folders 1 209 through n 210 to correspond to the set of n elements used to construct the third identifier. In other embodiments, the set of elements used to construct the identifier may not be restricted to numbers. For example, the set of elements may comprise of characters, names, objects, images or anything that may be used to identify a user. In addition, the set or the number of elements for each identifier of the PIN code may be different. For example, the first identifier may include a set of numbers, the second identifier may include a set of characters, and the third identifier may include a set of objects. Thus, n may be a different number for each level of the hierarchy.

Underneath the last level in the hierarchy of authentication folders corresponding to a user PIN code is a user folder associated with that user. For example, if a user's PIN code is 524 then underneath level 3 folder 4 of level 2 folder 2 of level 1 folder 5 of the hierarchy of authentication folders is a folder for the user with the PIN code of 524. FIG. 2 shows that for user 1 211 with a PIN code of 111, a user folder is placed at the end of the directory path underneath level 1 folder 1, level 2 folder 1 and level 3 folder 1. The user folder further contains a directory of profile activation option folders shown as profile activation option 1 212 to profile activation option m 213. The profile activation option folders may include user selectable options such as the type of media content available or the duration of access desired. The profile activation option folders for a user may be visible only when the hierarchy of authentication folders corresponding to the PIN code of the user is selected. For example, when the hierarchy of authentication folders corresponding to the user with the PIN code of 524 is selected, the profile activation option folders for the user may become visible to present media content authorized for access by the user. In addition, the profile activation option folders may present duration-of-access options so the user may access the media content for 5 minutes, for one hour, for 3 hours or until logout.

Figure 3:
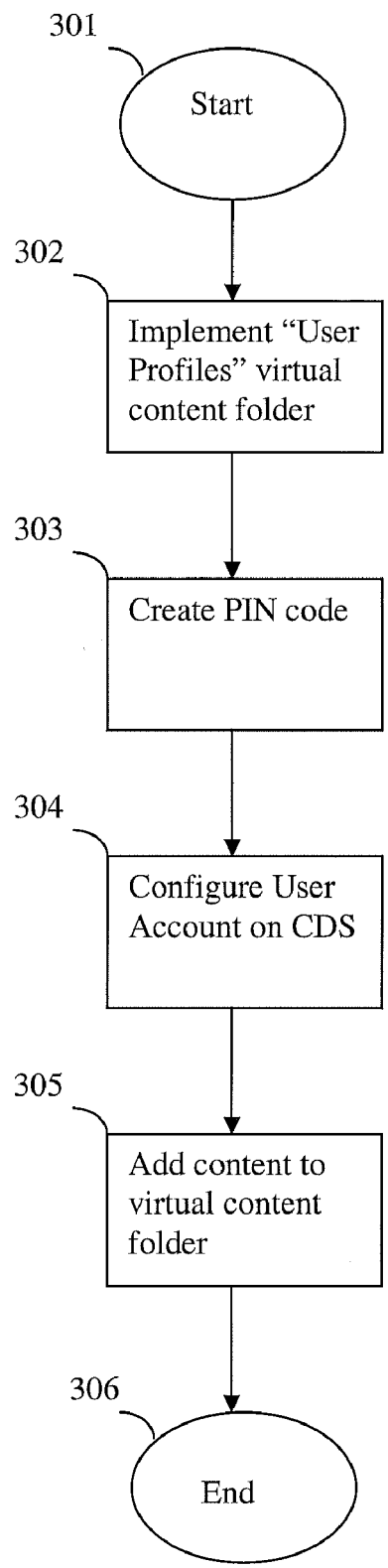
FIG. 3 illustrates an example method of configuring user accounts in a user profiles directory of a control directory server.

FIG. 3 illustrates an example method of implementing the user profiles directory 204 of FIG. 2 and of configuring user accounts in the user profiles directory 204. Media content may be provided by the DMS directly or through a data storage platform such as a network attached storage (NAS) device. When a DMS or a NAS is acquired, a user or a system administrator implements the user profiles directory and the hierarchy of authentication folders in the CDS 102, creates PIN codes for users, configures user accounts, and implements access rights and service levels for the user accounts. Referring to FIG. 3, after start 301, the user profiles directory and the hierarchy of authentication folders are implemented in step 302. As shown in FIG. 2, the hierarchy of authentication folders may be implemented such that the number of levels of the hierarchy is the same as the number of identifiers in the PIN code; the set of folders at each hierarchy level may also be implemented to correspond to the set of elements used to construct the corresponding identifier. The user profiles implementation step of 302 may be bypassed if the user profile directory has already been implemented and the system administrator needs only to create a user account for a new user. In step 303, a user creates a PIN code by selecting the identifiers from the set of elements for each identifier. For example, a user may select identifiers 5, 2 and 4 to create the PIN code 524 from the set of elements comprising of numbers 0 through 9. Once a user creates a PIN code, step 304 configures a user account for the user by creating and placing a user folder at the end of the directory path of the hierarchy of authentication folders corresponding to the PIN code. For example, FIG. 2 shows that for a user with a PIN code of 111 a user folder labeled user 1 is placed at the end of the directory path of the hierarchy of authentication folders comprising level 1 folder 1, level 2 folder 1 and level 3 folder 1. If there is another user with the same PIN code, then a user account may already exist at the same location. A separate user account is then created for the new user and the user folder is so labeled as to distinguish it from the user folder for the existing user. Alternatively, if the user does not create a PIN code or chooses to access the user account without authentication, its user account and user folder may be configured at the top of the hierarchy of authentication folders directly under the user profiles directory. Step 305 creates the profile activation folders under the new user folder to add the media content authorized for access by the user and to configure the access rights and the service levels associated with the new user. For example, for certain type of user such as a visitor or a minor, access to certain media content on the DMS or the NAS may be restricted or denied. Even for media content allowing full access privilege, service level may be configured to grant access based on periods of access or other parameters. When a user selects a profile activation folder, a user profile is activated to allow the user to access the media content with the chosen service level.

The authentication folders in an embodiment of the present disclosure enable a device to authenticate and authorize another device in a simple, extensible manner without modifying or installing any software on the client device operated by the user. As such, the authentication folders operate more like a profile selection by allowing a user to navigate through the hierarchy of authentication folders to select a user folder and to activate a user profile. In order to reduce the possibility of a user attempting to gain unauthorized access to other user's folder by trying multiple PIN codes, the CDS may detect and eliminate multiple query requests within a short period of time. Embodiments of the present disclosure in allowing user authentication based on hierarchical folder browsing may also be referred to as "folder knocking," and may enable device authentication by a directory server in a shared network other than a UPnP.

Embodiments of the present disclosure also organize the media content in a hierarchical structure to service devices with different access rights and to accommodate growth in the number and type of content. For example, user folders or profile activation option folders may only contain virtual links to media content stored in the main content directories of the CDS. The virtual links allow users to access the media content from the main content directories as if the media content is stored in the user folders. The main content directories such as the photos 201, videos 202, or music 203 folders of FIG. 2 may then contain all the media content, public or non-public for all the users, and be organized hierarchically to allow the CDS to better accommodate service requests from multiple users with different access rights and service levels.

Figure 4:
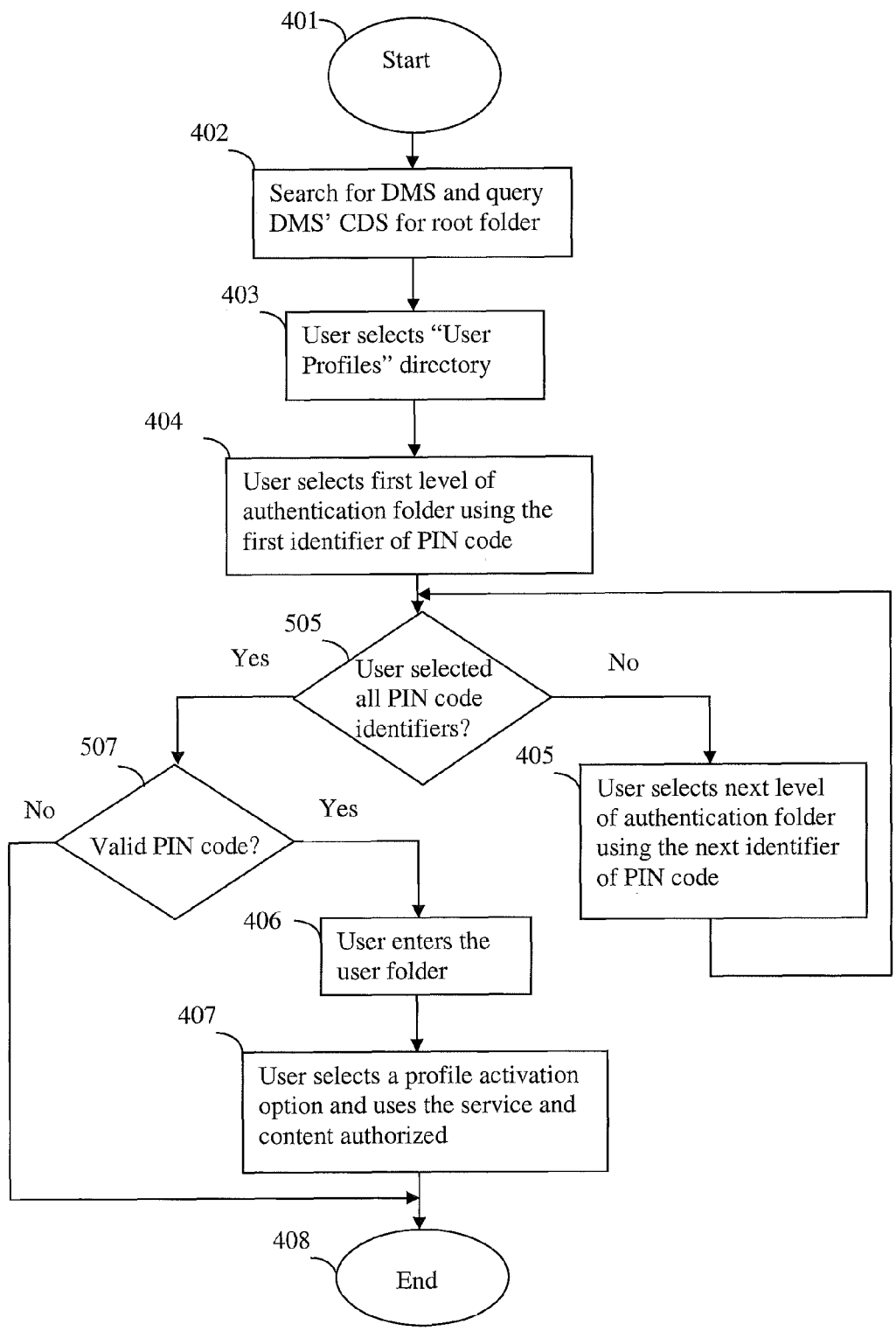
FIG. 4 illustrates an example method of a user using the authentication folders of a user profiles directory of a control directory server to activate a user profile.
Figure 5:
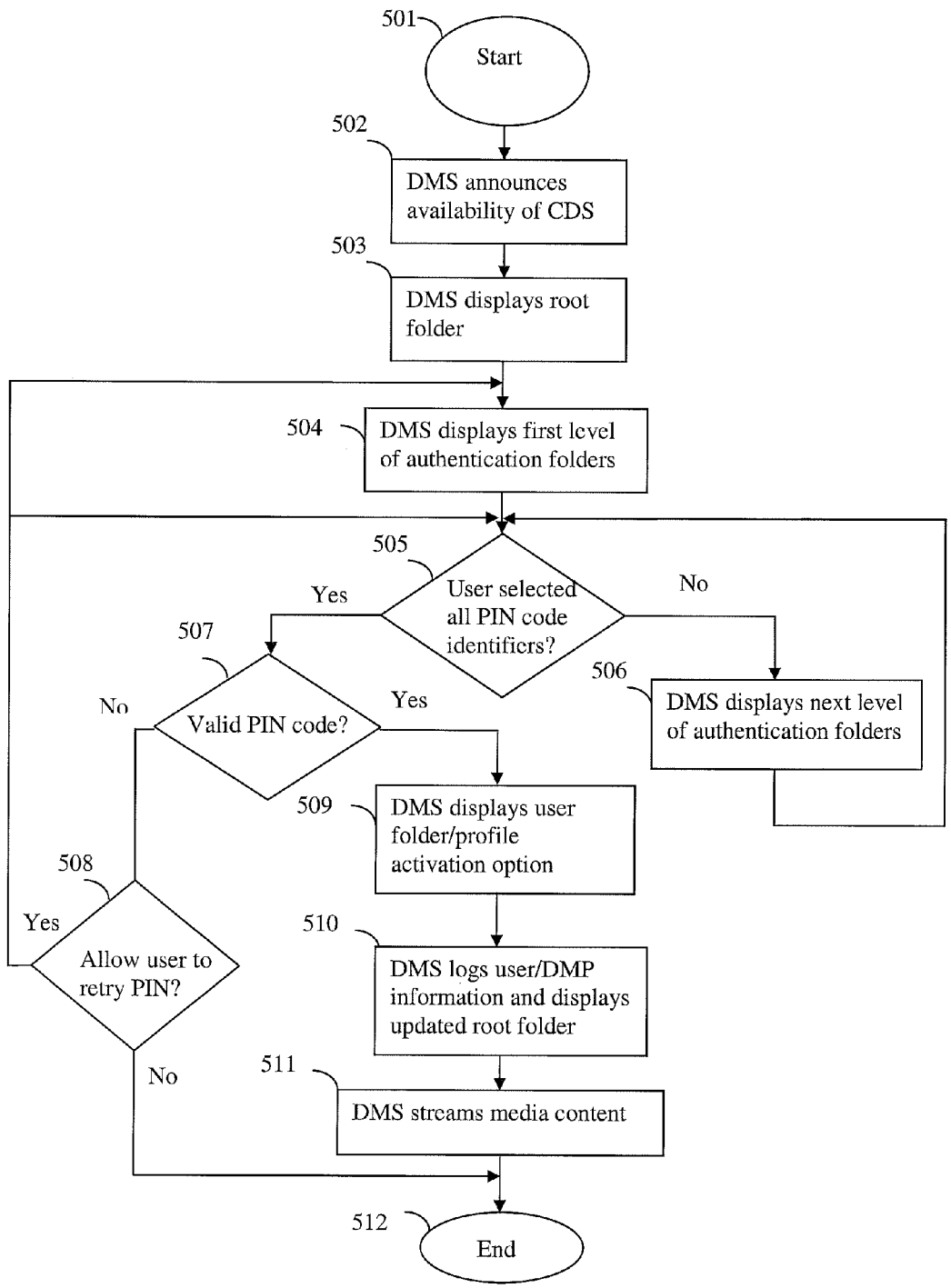
FIG. 5 illustrates an example method of a digital media server authenticating and authorizing user for media access on the control directory server.

FIG. 4 and FIG. 5 illustrate an example method of a user on a DMP using the virtual content folders of a user profiles directory of a CDS running on a DMS to activate a user profile. FIG. 4 illustrates the user interaction on the DMP. FIG. 5 illustrates the authentication and authorization of the user for media access on the DMS. The DMP starts by searching for DMS that implements the CDS in 402. There are two ways for the DMP to find the DMS with the CDS service. One is for the DMP to broadcast a discover message requesting CDS service to solicit responses from all networked devices that support the CDS service. The second way is for the DMP to listen for notify messages announcing the availability of the CDS service. All UPnP devices periodically transmit notify messages announcing the availability of the services they host. Whether in response to a discover message or done autonomously, the DMS announces the availability of CDS in 502. Once the DMP finds a DMS that hosts CDS, the DMP queries the DMS's CDS for its root directory. The DMS may present its root directory in 503 and as shown in an example embodiment in FIG. 2. FIG. 2 shows the root directory containing the main content directories such as the photos 201, videos 202, and music 203 folders within which only the publicly available media are visible to any user, and the user profiles folder containing the hierarchy of authentication folders.

In order for the user to gain access to the media content that has been configured for the user account, the CDS has to authenticate the user. For proper authentication, the user pushes down through the hierarchy of authentication folders corresponding to the user's PIN code to reach the user folder. The user first selects the user profiles directory from the CDS root directory in 403. The CDS will then present the first level of the authentication folders showing the set of folders corresponding to the set of elements used to construct the first identifier of the PIN code in 504. From these folders the user selects the folder corresponding to the first identifier of its PIN code in 404. The CDS checks to see if the user has finished selecting all identifiers of the PIN code in 505. If not, the CDS will present the next level of the authentication folders showing the set of folders corresponding to the set of elements used to construct the next identifier of the PIN code in 506. From these folders the user selects the folder corresponding to the next identifier of its PIN code in 406. Steps 505, 506 and 406 are repeated until the user has finished selecting all the identifiers of its PIN code. At this point, the CDS authenticates the user's identity by verifying if the hierarchy of authentication folders selected by the user corresponds to a valid PIN code in 507. If it is not a valid PIN code, the CDS determines if it will allow the user to reenter the PIN code in 508. If the CDS allows the user to reenter the PIN code, the CDS may present the root directory again for the user to restart the authentication steps. Optionally, the CDS may backtrack to the previous level in the authentication folders to allow the user to reselect the folder for the last identifier.

Alternatively, if the CDS detects multiple invalid PIN code selection from a user within a short period of time, it may abort the authentication session altogether in 512 to reduce the possibility of a user attempting to gain unauthorized access to other users' folders. The media access control (MAC) address of the DMP used to initiate such multiple PIN entries may be logged by the CDS to deny further access by the DMP to the user profile directory for a set period of time. For example, a crawler device such as a UPnP search engine may crawl the hierarchy of authentication folders in an attempt to sniff out user accounts. The CDS may detect multiple PIN entries from the crawler device and may deny further authentication requests from the crawler device for some time period. Even though the CDS may deny access to the user profile directory for authentication by a DMP, the DMP may still have full access to the publicly available media in the root directory of the CDS. Additionally, the CDS may only deny authentication requests from the DMP with the logged MAC address. This provides recourse for a user who has inadvertently selected the wrong authentication folders and thus denied authentication requests from a DMP to use another DMP or DMC to gain access to its user folder, or to simply gain access to the publicly available media from the blocked DMP.

Once the PIN code is valid and the user has been authenticated, the CDS may present a user folder at the end of the hierarchy of authentication folders in 509. The user may select the user folder to see the profile activation options under the user folder in 406. Alternatively, the CDS may present the profile activation options directly at the end of the hierarchy of authentication folders. The profile activation options may include a set of folders presenting different access rights or service levels to the user such as accesses to different media content with defined durations. When the user selects a profile activation option folder in 407, the CDS may log the MAC address of the DMP, the device name of the DMP, the user ID, and the selected duration of access in 510. The CDS then activates the user profile for the user on the DMP and presents the selected media content for the selected duration of access along with the publicly available media in the main content directories of the CDS. Alternatively, after the CDS actives the user profile, the CDS may present the selected media content in a separate folder apart from the publicly available media in the main content directory. The user may proceed to access the desired media content and the DMS will stream the media content in 511. While the authenticated user sees the media content authorized for access by the user, any other unauthenticated users only see the publicly available media in the CDS root directory unless they activate their user profile separately.

It should be understood that the invention can be practiced with modification and alteration to the embodiments described and be within the spirit and scope of the appended claims. The description is not intended to be exhaustive or to limit the invention to the precise embodiments disclosed. It should be understood that the invention can be practiced with modification and alteration and that the invention is limited only by the claims and the equivalents thereof.

What is claimed is:

1. An apparatus, comprising:
a media server including a processor, wherein the media server is configured to provide media content for a Universal Plug and Play (UPnP) network; and
a non-transitory machine readable medium adapted to store a plurality of machine readable instructions which when executed by the processor causes a content directory server (CDS) to configure a hierarchy of authentication folders to correspond to a personal identification number (PIN) code of a user, wherein:
the PIN code comprises a sequence of identifiers;
the hierarchy of authentication folders comprises levels corresponding to the identifiers of the PIN code for the user; and
each of the levels of the hierarchy of authentication folders comprises folders corresponding to elements used to construct the corresponding identifiers of the PIN code; and
wherein the CDS is configured to authenticate the user by matching a sequential selection of the authentication folders with the authentication folders corresponding to the PIN code, and to grant the user access to non-public media content if the user is authenticated.

2. The apparatus of claim 1, wherein the authentication folders are file folders.

3. The apparatus of claim 1, wherein the identifiers comprise a combination of one or more of characters, numbers, letters, words, or images.

4. The apparatus of claim 1, wherein an end of the hierarchy of the authentication folders comprises one or more folders with user selectable time accessibility periods for accessing the non-public media content.

5. A method, comprising:
configuring by a processor a hierarchy of authentication folders to correspond to a personal identification number (PIN) code of a user, wherein:
the PIN code comprises a plurality of identifiers;
the hierarchy of authentication folders comprises levels corresponding to the identifiers of the PIN code for the user; and
each of the levels of the hierarchy of authentication folders comprises folders corresponding to elements used to construct the corresponding identifiers of the PIN code;
comparing sequentially by the processor a series of selected authentication folders from the hierarchy of authentication folders with the authentication folders corresponding to the PIN code for user authentication; and
allowing the user access to non-public media if the series of selected authentication folders matches the authentication folders corresponding to the PIN code.

6. The method of claim 5, further comprising creating virtual paths for the authentication folders emulating file folders.

7. The method of claim 5, further comprising limiting access to the user based on a selection of one or more predetermined time periods.

8. The method of claim 5, wherein the identifiers comprise a combination of one or more of characters, numbers, letters, words, or images.

9. A method, comprising:
providing by a media server a first level of a hierarchy of authentication folders for selection, wherein:
the number of levels of the authentication folders comprises a number of identifiers for a personal identification number (PIN) code of a user; and
providing the first level of the hierarchy of authentication folders includes providing folders corresponding to elements of a first identifier of the PIN code;
providing by the media server contents from a selected one of the first level of authentication folders, wherein the contents comprise a second level of the authentication folders for further selection;
continuing sequentially providing contents from selected ones of succeeding levels of the authentication folders until the number of identifiers is reached; and
allowing access of non-public media to the user if the selection of the folders of the hierarchy of authentication folders matches the PIN code.

10. The method of claim 9, further comprising creating virtual paths for the authentication folders to emulate file folders.

11. The method of claim 9, further comprising limiting access to the user based on a selection of one or more predetermined time periods.

12. The method of claim 9, further comprising providing a previous level of the hierarchy of authentication folders for reselection if the selection of the folders of the hierarchy of authentication folders does not match the PIN code.

13. The method of claim 12, further comprising counting a number of said reselection of the folders within a time period and ending the method if the number exceeds a second number.

14. The method of claim 9, further comprising providing profile activation option folders for further selection if the selection of the folders of the hierarchy of authentication folders matches the PIN code.

15. The method of claim 14, further comprising updating content folders and managing access to contents in the content folders after a selection of the profile activation option folders.

16. The method of claim 9, wherein the identifiers comprise a combination of one or more of characters, numbers, letters, words, or images.

17. The method of claim 9, further comprising organizing the non-public media hierarchically to facilitate access of the media.

* * * * *